(12) United States Patent
Fuller et al.

(10) Patent No.: US 7,880,634 B2
(45) Date of Patent: Feb. 1, 2011

(54) REMOTE MONITORING OF REAL-TIME INFORMATION OF A SELECTED ITEM AND TRANSMITTING INFORMATION TO SELECTED DESTINATION

(75) Inventors: Bruce Gordon Fuller, Edmonton (CA); Kevin George Gordon, Vancouver (CA); Mark David Hobbs, Hartford, WI (US); Mohamed Salehmohamed, Surrey (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 710 days.

(21) Appl. No.: 11/864,952

(22) Filed: Sep. 29, 2007

(65) Prior Publication Data
US 2009/0085753 A1 Apr. 2, 2009

(51) Int. Cl.
*G08B 7/00* (2006.01)

(52) U.S. Cl. .................................. 340/691.6; 340/539.1

(58) Field of Classification Search ..............................
340/539.22–539.29, 691.1–691.6
See application file for complete search history.

(56) References Cited

U.S. PATENT DOCUMENTS

2007/0139183 A1* 6/2007 Kates ......................... 340/521
2007/0252691 A1* 11/2007 Mirmobin et al. ...... 340/539.22

* cited by examiner

*Primary Examiner*—Jeffery Hofsass
(74) *Attorney, Agent, or Firm*—Setter Roche LLP; Alexander R. Kuszewski; John M. Miller

(57) ABSTRACT

A method for remote monitoring of real-time information is provided. In the method, a representation is displayed of each of a plurality of items configured to generate the real-time information. Also displayed is a representation of each of a plurality of destinations configured to receive the real-time information. The real-time information is received from the items. A command is received which selects one of the items and one of the destinations. After receiving the command, at least a portion of the real-time information received from the selected item is transmitted to the selected destination.

27 Claims, 5 Drawing Sheets

REMOTE MONITORING OF REAL-TIME INFORMATION OF A SELECTED ITEM AND TRANSMITTING INFORMATION TO SELECTED DESTINATION

BACKGROUND

Industrial processes, such as petroleum refining, water treatment, materials manufacturing, and the like, often require constant monitoring of process data whose values are changing in real-time to ensure the process is performing as expected or desired. Such data may include, for example, pressure, temperature, and flow rate of a liquid or gas being maintained or transferred in a conduit or container. Typically, a computer system receives and displays such information from sensors to allow one or more users, such as a process operator or shift manager, to monitor the process data in a real-time manner. In addition, such a computer system may be located local to or distant from the particular process being monitored.

To facilitate mobility, laptop computers that possess the processing power of desktop models are sometimes used to facilitate receipt and display of the data generated by an industrial process at a remote location. However, other communication devices, such as cell phones and personal digital assistants (PDAs), while providing more mobility, may not provide the same processing or graphics capabilities required to adequately monitor the entire process. Further, a particular user may not be interested in observing the entire process, but instead only desire to monitor a particular portion of the process, such as the functioning of a specific pump or valve.

SUMMARY

In one embodiment, a method for remote monitoring of real-time information is provided. The method includes displaying a representation of each of a plurality of items configured to generate the real-time information, as well as a representation of each of a plurality of destinations configured to receive the real-time information. The real-time information is received from the items. A command is received selecting one of the items and one of the destinations. After receiving the command, at least a portion of the real-time information received from the selected item is transmitted to the selected destination. In a related embodiment, a computer-readable including instructions executable on a processor may employ the above method.

In another embodiment, a computer system is provided which includes a processor coupled with a display, communication circuitry, and a user interface. The communication circuitry is configured to receive real-time information from a plurality of items, while the user interface is configured to receive a command selecting one of the items and one of a plurality of destinations. The processor is configured to present a representation of each of the items and a plurality of destinations. The processor is also configured to receive the command from the user interface, and in response, transmit at least part of the real-time information received from the selected item to the selected destination via the communication circuitry.

Additional embodiments and advantages of the present invention will be ascertained by those skilled in the art upon perusal of the following detailed description, taken in conjunction with the accompanying drawings.

DETAILED DESCRIPTION

Figure 1:
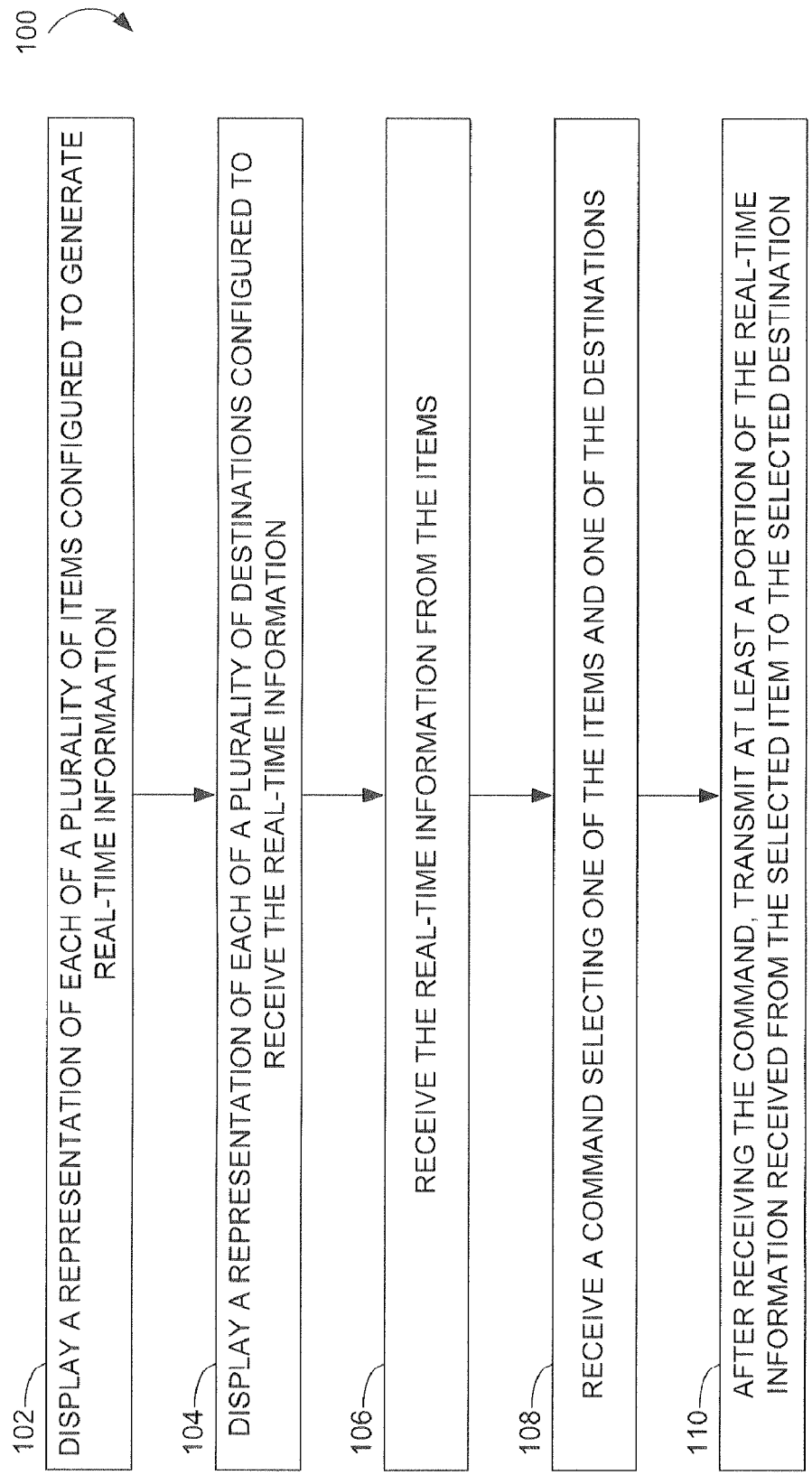
FIG. 1 is a flow diagram of a method according to an embodiment of the invention for remote monitoring of real-time information.

FIG. 1 provides a flow diagram of a method 100 according to an embodiment of the invention for remote monitoring of real-time information. In the method 100, a representation of each of a plurality of items is displayed, where each of the items is configured to generate the real-time information (operation 102). Also displayed is a representation of each of a plurality of destinations configured to receive the real-time information (operation 104). The real-time information is received from the items (operation 106). Also received is a command selecting one of the items and one of the destinations (operation 108). After receiving the command, at least a portion of the real-time information received from the selected item is transmitted to the selected destination (operation 110). A separate embodiment provides a computer-readable medium comprising instructions executable on a processor for employing the method 100.

Figure 2:
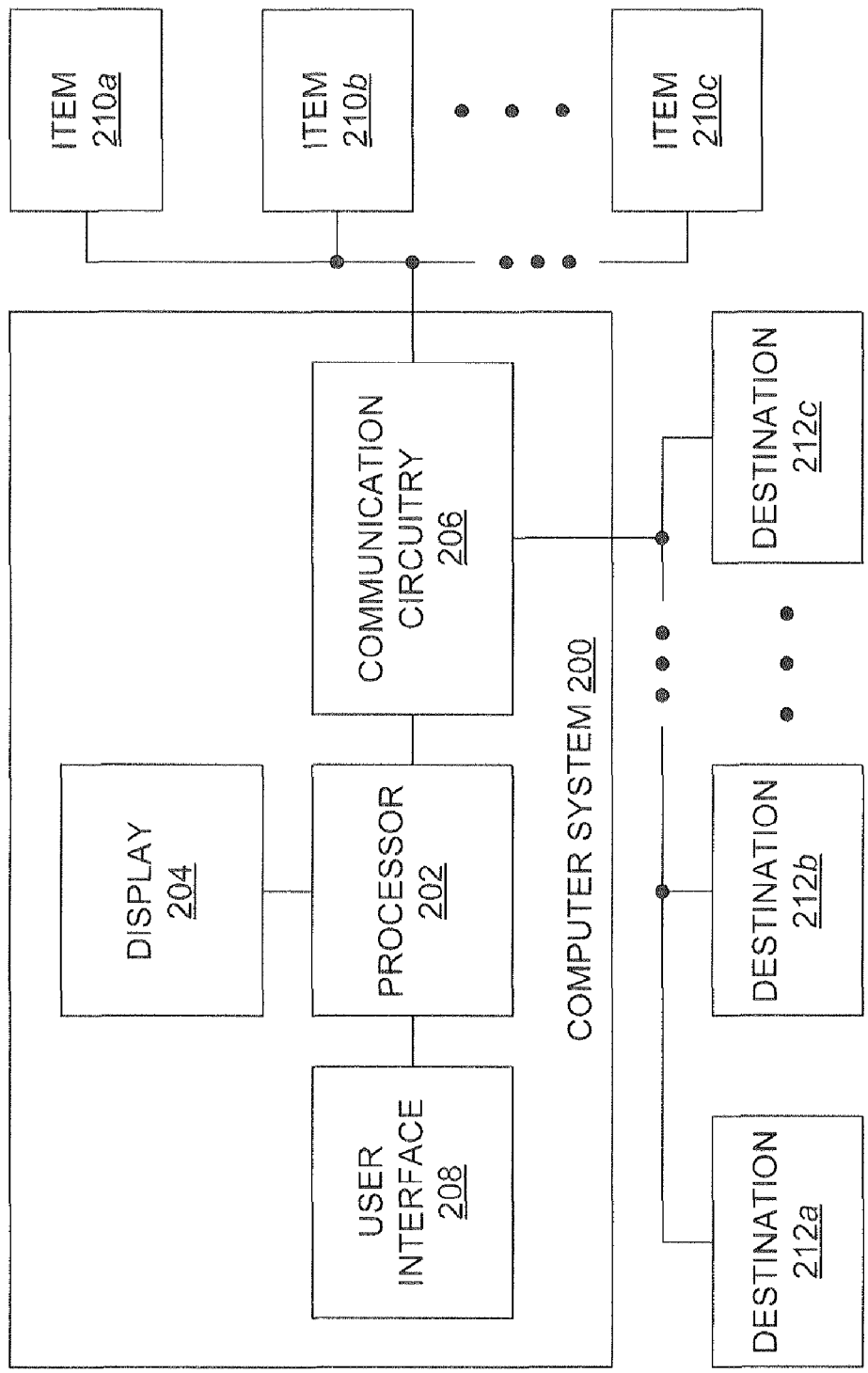
FIG. 2 is a block diagram of a computer system according to an embodiment of the invention.

FIG. 2 depicts a computer system 200 according to another embodiment of the invention. The computer system 200 includes a processor 202 which is coupled to a display 204, communication circuitry 206, and a user interface 208. The communication circuitry 206 is configured to receive real-time information from a plurality of items 210a-210c. The user interface 208 is configured to receive a command selecting one of the items and one of a plurality of destinations 212a-212c. The processor 202 is configured to present a representation of each of the plurality of items 210 and destinations 212 on the display 204. The processor 202 is also configured to receive the command from the user interface 208, and in response to the command, transmit at least a portion of the real-time information received from the selected item 210 to the selected destination 212 by way of the communication circuitry 206.

Figure 3:
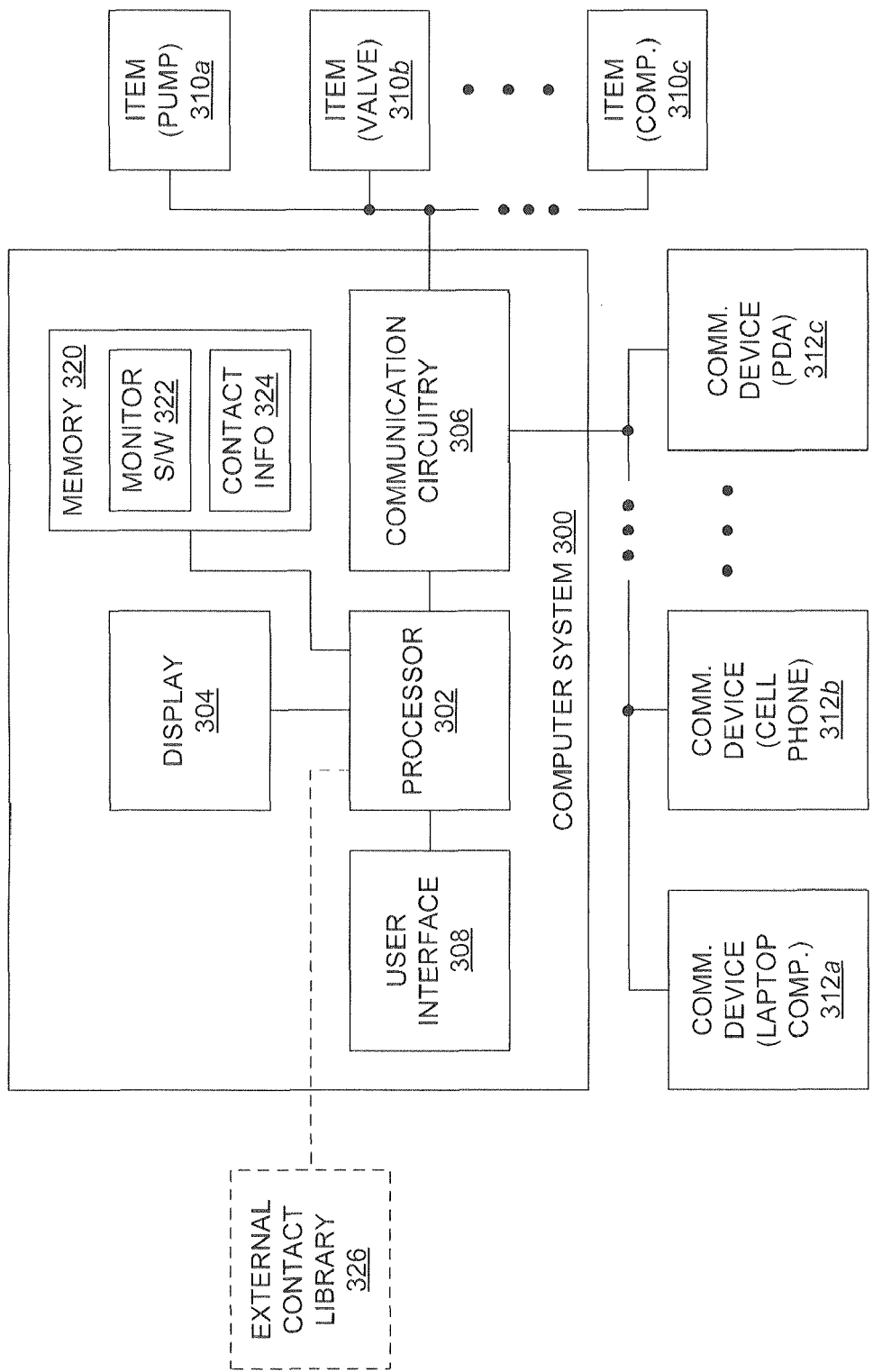
FIG. 3 is a block diagram of a computer system according to another embodiment of the invention.

FIG. 3 provides a more detailed implementation of a computer system 300 according to another embodiment of the invention. The system 300 includes a processor 302 communicatively coupled with a display 304, communication circuitry 306, a user interface 308, and a memory 320. The display 304 may be any display device, such as a monitor, flat panel display, or the like, capable of presenting visual or graphical information to a user. The user interface 308 may include, for example, a keyboard along with a mouse, touchpad, joystick, or other graphical indicator device, thus allowing a user to provide commands to the processor 302. The memory 320 may include random access memory (RAM), read-only memory (ROM), hard disk drive (HDD) memory, and other forms of memory, both volatile and nonvolatile.

The processor 302 may be any type of algorithmic processing unit, such as a microprocessor, microcontroller, or digital signal processor (DSP), capable of executing software instructions for completing the various tasks described in greater detail below. In one embodiment, the software instructions are stored as monitoring software 322 located within the memory 320. The computer system 300 may also include digital logic configured to aid the processor 302 in completing the various tasks described below as directed by the monitoring software 322.

The communication circuitry 306 is configured to provide a communications link with each of a number of items 310a-310c which provides real-time information to be monitored. In the particular embodiment of FIG. 3, each of the items 310 may be a processing unit of an automated process line, such as that which may be found in a factory automation or industrial process environment. Such units may include pumps, values, compressors, condensers, containers, and the like. Each of these units may generate real-time information in the form of data related to one or more specific physical parameters, such as the temperature, pressure, or flow rate of a liquid, gas, or other product. Such information may be gathered by way of one or more sensors (not shown in FIG. 3) and transmitted to the communication circuitry 306 of the computer system 300.

Also coupled with the communication circuitry 306 is a plurality of communication devices 312a-312c. Each communication device 312 may be any device capable of receiving at least a portion of the real-time information being generated by the items 310 of FIG. 3. Such devices may include desktop computers, laptop computers, personal digital assistants (PDAs), landline phones, cell phones, pagers, and so on.

Given the various types of monitored items 310 and communication devices 312 that may be coupled with the communication circuitry 306, the communication circuitry 306 may comprise any of a number of different communication interfaces. These interfaces may provide communication with, for example, an Ethernet network, a Transfer Control Protocol/Internet Protocol (TCP/IP) network, a packet-switched telephone network (PSTN), a cellular phone network, a digital bus employed in a process automation environment, and the like. However, the communication circuitry 306 is shown in FIG. 3 as a single functional block to simplify the discussion presented herein.

In one embodiment, the memory 320 also includes contact information 324 for each of the communication devices 312 to allow the processor 302 to address and communicate with each of the communication devices 312. The contact information may include, but is not limited to, telephone numbers, fax numbers, e-mail addresses, and uniform resource locators (URLs). In another implementation, the contact information 324 may be located in an external contact library 326 coupled with the processor 302 of the computer system 300. The contact library 326 may be located in an external data storage device, a database system, or some other external data source.

Figure 4A:
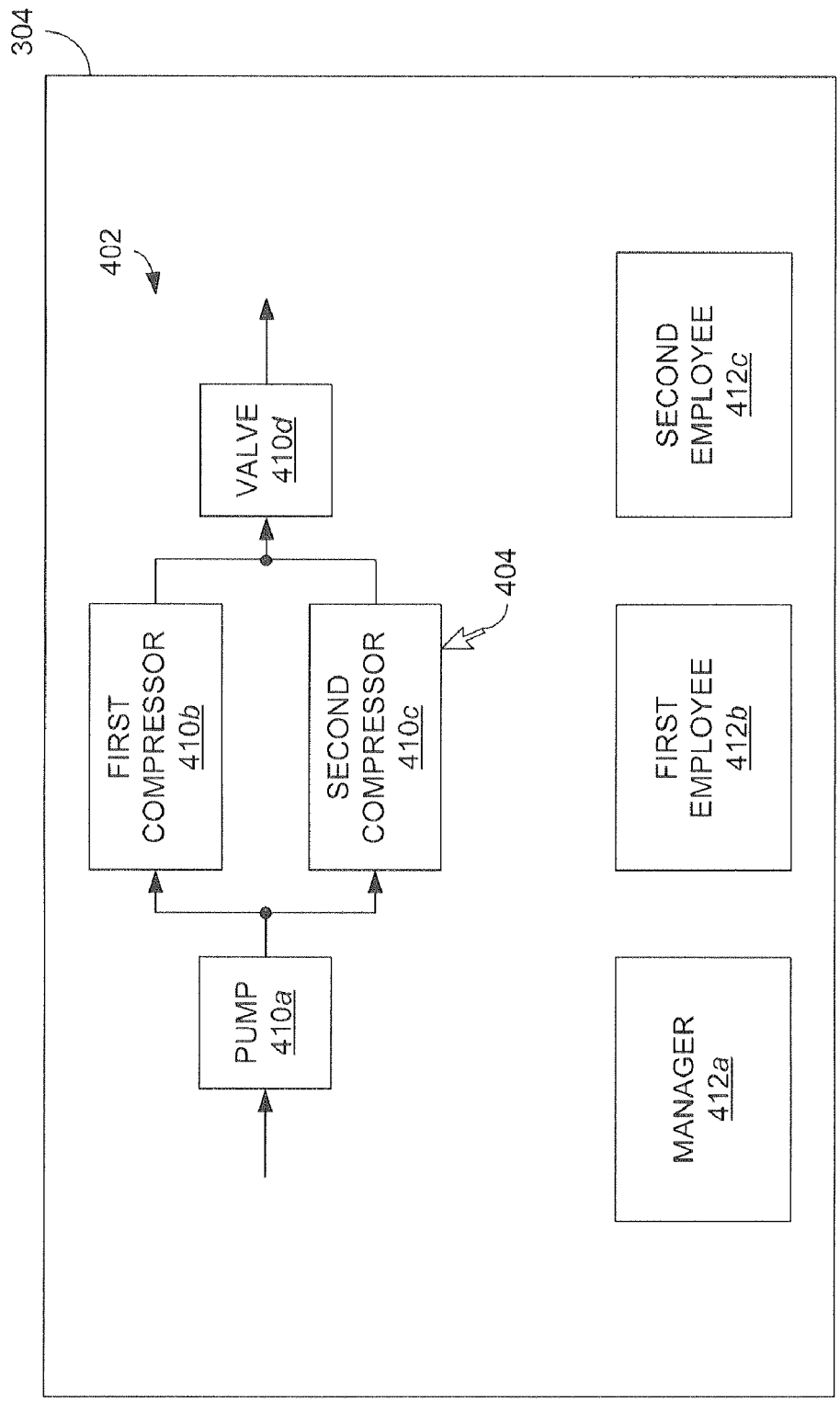
FIG. 4A is a view of a display of a computer system according to an embodiment of the invention prior to a monitored item being associated with a destination for real-time information.

In operation, the processor 302 is configured to present a representation of each of the plurality of the monitored items 310 generating real-time information and of each of a number of destinations capable of receiving at least a portion of the real-time information. For example, FIG. 4A depicts a possible view of the display 304 which shows a graphical representation of a number of processing units 410a-410d of a manufacturing line 402, including a representations for a pump 410a, a first compressor 410b, a second compressor 410c, and a valve 410d. In this particular example, the mutual relationship of the various processing units 410 within the manufacturing line 402, such as how each is coupled with the other, is explicitly illustrated on the display 403. Each of the units 410 may also be represented by way of an icon or other graphic suggesting the functionality of the associated unit 410. In other embodiments, other items 410 capable of producing real-time information to be monitored may be represented.

Also illustrated in FIG. 4A are representations for three destinations 412a-412c. In FIG. 4A, the destinations 412 represent personnel, such as a manager 412a, a first employee 412b, and a second employee 412c. Each of these personnel 412 may be associated with, or have access to, one or more of the communication devices 312 of FIG. 3. Further, each of the personnel 412 may be represented by way of text indicating the name and/or employee number of the personnel 412, a photo of the personnel 412, or other information identifying the personnel 412 acting as the destination for real-time information. In another embodiment, the destinations 412 may instead more directly represent the communication devices 312 coupled with the communication circuitry 306 of the computer system 300. In another example, the representations of the destinations 412 may depict the contact information 324 discussed above that is associated with each of the communication devices 312.

Figure 4B:
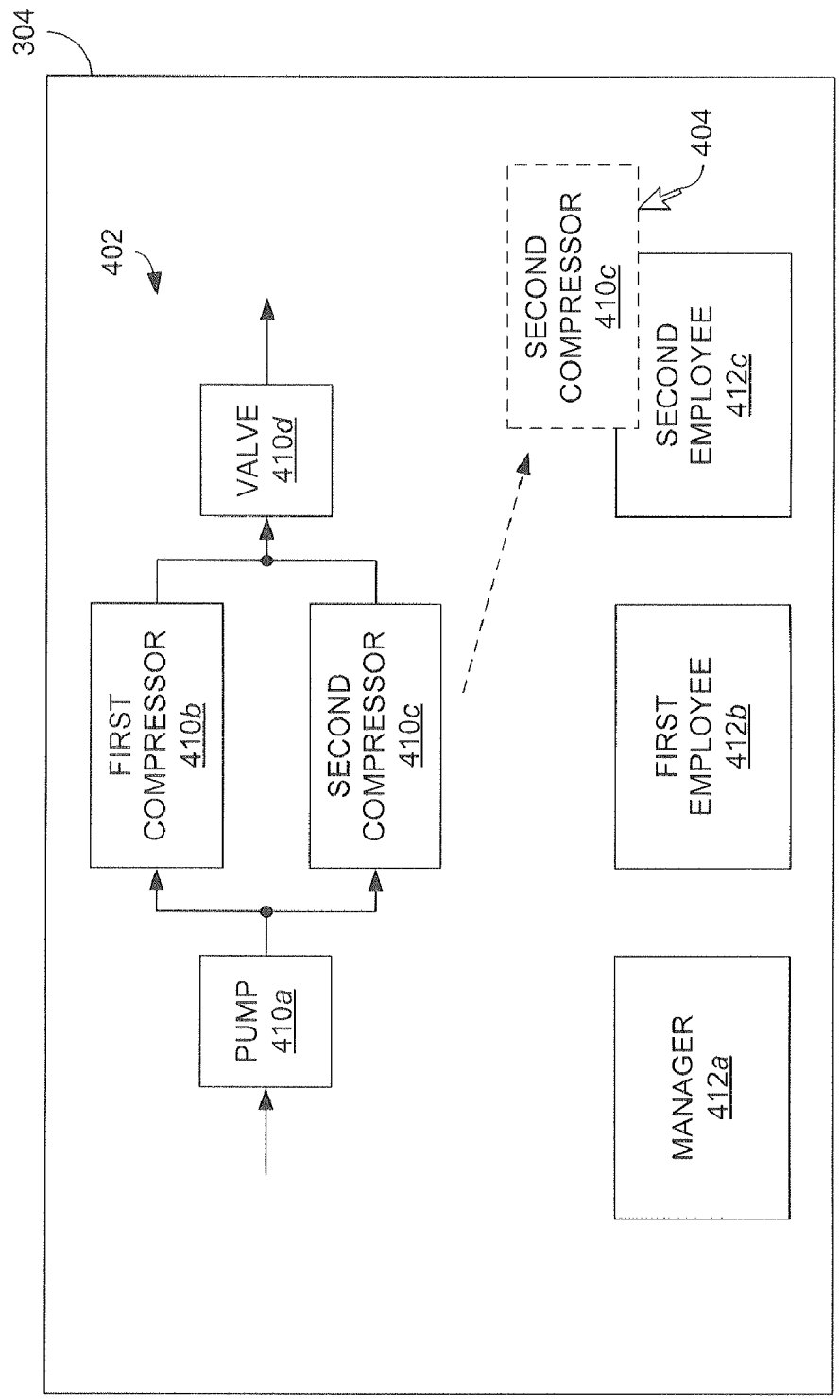
FIG. 4B is a view of the display of a computer system according to an embodiment of the invention in which a monitored item is associated with a destination for real-time information.

The user interface 308 of the system 300 is configured to receive a command selecting one of the monitored items 410 and one of the destinations 412, effectively associating the selected item 410 with the selected destination 412. In the example of FIG. 4A, a cursor 404 controllable by way of the user interface 308, such as a mouse, provides a means by which a user may enter such a command. In FIG. 4A, the display 304 shows that the cursor 404 has been placed in the vicinity of the second compressor 410c in order to select the second compressor 410c, such as by way of a click of a mouse button. FIG. 4B further shows the cursor 404 being employed to drag the representation of the second compressor 410c to the representation of the second employee 412c, thus selecting the second employee 412c in association with the second compressor 410c. Other methods of selecting a monitored item 410 and a destination 412 for real-time information, such as double-clicking, highlighting, outlining, and the use of text entry, may be utilized in other implementations.

The command received by the user interface 308 is then transmitted to the processor 302. In response to the command, the processor 302 may transfer all or a portion of the real-time information received from the selected monitored item (i.e., the second compressor 410c) to the selected destination (i.e., the second employee 412c). In one embodiment, the processor 302 looks up the contact information 324 associated with the selected destination 412, such as a phone number or e-mail address, and transfers real-time information associated with the selected item 410 using the contact information 324. More than one communication device 312 may be associated with the selected destination 412, thus allowing the real-time information to be transferred to more than one communication device 312 concurrently. The information may be transferred in any of a number of forms, such as an e-mail message, a computer-generated voice message, a Short Message Service (SMS) text message, and a pager notification. Also, the real-time information may first be processed by way of averaging, value-limiting, translating, or any other processing function before being transferred to the selected destination 412.

In one implementation, all of the real-time information associated with the selected monitored item 410 may be transferred to the selected destination 412. In another example, only selected real-time information being generated by the selected item 410 may be transferred. To that end, the user interface 308 may accept a second command indicating a type of data from the selected item 410 to the selected destination 412. For example, while real-time information related to several physical parameters, such as temperature, pressure, or data flow, may be generated by a single monitored item 410, the second command may be used to select one or more of these parameters, such as the temperature of a gas in the second compressor 410c, for reception.

The amount of data being transferred to the selected destination 412 may be further reduced by selecting a threshold for the selected data type in the second or other command. In that case, the processor 302 may only forward the selected data type of the real-time information when the value of the selected data type exceeds or falls below the selected threshold. Continuing with the above example, the processor 302 may forward the selected temperature information from the second processor 410c only if the temperature exceeds a selected threshold of 90 degrees Celsius. In another implementation, multiple thresholds may be selected such that the selected data type of the real-time information is transferred to the selected destination 412 if the data falls below a first selected threshold or exceeds a second selected threshold.

Further, the volume or frequency at which the real-time information is delivered may be selected by way of another command to the computer system 300 in another embodiment. For example, the command may select a minimum update time interval indicating how often the data may be transferred to the selected destination 412. For example, in the case of a cell phone or pager, a user may decide that updates no more often than once every half hour are warranted. On the other hand, a user of a desktop or laptop computer may desire more frequent, or essentially continuous, updates. Upon receipt of such a command at the user interface 308, the command may be passed to the processor 302, which may transfer the selected real-time information from the selected item 410 to the selected destination 412 at the desired interval. Further, commands that allow different update intervals depending on the content of the real-time information may also be provided in other embodiments.

In the foregoing discussion, commands responsible for selecting the monitored item 410 and the destination 412, the particular data types to be received, and any associated thresholds, as well as any specified updating intervals, are issued by way of the user interface 308. In another embodiment, such commands may also be submitted to the computer system 300 by way of communication circuitry 306, thus allowing the commands to be entered into a communication device 312 and then transferred to the processor 302 by way of the communication circuitry 306.

In various embodiments as described above, real-time information typically received for display on a computer system located near the items generating the information may instead be directed to a different destination, such as a communication device coupled with the computer system receiving the real-time information. Commands may be issued to the computer system to select one or more devices as the source of the information to be transferred, thus limiting the amount of information to that information in which the user is interested or which the destination is capable of receiving. For example, certain personnel may only be responsible for certain portions of an industrial process. Similarly, the type of communication device being used by the personnel at any particular time, such as a cell phone or pager, may not be well-suited to receive all of the real-time information being generated.

The amount of information may be further limited to one or more specific types of data generated by the monitored item to focus attention to only those particular data of interest. Allowing further qualification of the transmitted data by way of an upper or lower threshold provides a mechanism by which only real-time information indicating a problem may be transmitted to the selected destination. The intervals at which the real-time information may be sent to the selected destination may also be programmed so that devices better suited for only short, infrequent data transfers, such as cell phones and pagers, may receive such messages, while other devices, such as laptop computers, may receive a more continuous flow of information.

In addition, allowing commands for making the various selections discussed above by either a local user interface of the computer system or a remote connection with a communication device allows customization of the information to the needs of the user on short notice. Such capability is exceptionally useful when the communication device issuing the commands is the same device that will be receiving the transmitted real-time information.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring of industrial processes, such as manufacturing environments, other applications, such as the local or remote monitoring of any man-made or naturally-existing system, may benefit from use of the concepts discussed above. Systems that are more virtual in nature, such as stock-market quote systems, may also employ various aspects disclosed herein for monitoring purposes. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method for remote monitoring of real-time information, the method comprising:
    displaying a representation of each of a plurality of items configured to generate the real-time information;
    displaying a representation of each of a plurality of destinations configured to receive the real-time information;
    receiving the real-time information from the items;
    receiving a command selecting one of the items and one of the destinations; and
    after receiving the command, transmitting at least a portion of the real-time information received from the selected item to the selected destination.

2. The method of claim 1, further comprising:
    receiving a second command selecting a data type;
    wherein transmitting at least a portion of the real-time information comprises transmitting the selected data type of the real-time information after receiving the second command.

3. The method of claim 2, further comprising:
    receiving a third command selecting a threshold for the selected data type; and
    after receiving the third command, monitoring the real-time information received from the selected item to detect when the selected data type surpasses the selected threshold;
    wherein transmitting at least a portion of the real-time information comprises transmitting the real-time information received from the selected item to the selected destination in response to the selected data type surpassing the selected threshold.

4. The method of claim 2, wherein the selected data type comprises data associated with an industrial process.

5. The method of claim 4, wherein the selected data type comprises at least one of temperature, pressure, and flow rate.

6. The method of claim 1, further comprising:
receiving a second command selecting an update interval;
wherein transmitting at least a portion of the real-time information comprises transmitting the real-time information no more often than the selected update interval after receiving the second command.

7. The method of claim 1, wherein the selected destination comprises a communication device.

8. The method of claim 7, wherein the communication device comprises at least one of a desktop computer, a laptop computer, a personal digital assistant, a landline phone, a cell phone, and a pager.

9. The method of claim 1, wherein the selected destination comprises at least one of a telephone number, a fax number, an e-mail address, and a uniform resource locator.

10. The method of claim 1, wherein the selected destination comprises a user associated with a communication device configured to receive the real-time information received from the selected item.

11. The method of claim 1, wherein the selected item comprises a processing unit of an automated process line.

12. The method of claim 11, wherein the processing unit comprises at least one of a pump, a valve, a compressor, a condenser, and a container.

13. A computer-readable medium comprising instructions executable on a processor for employing a method for remote monitoring of real-time information, the method comprising:
displaying a representation of each of a plurality of items configured to generate the real-time information;
displaying a representation of each of a plurality of destinations configured to receive the real-time information;
receiving the real-time information from the items;
receiving a command selecting one of the items and one of the destinations; and
after receiving the command, transmitting at least a portion of the real-time information received from the selected item to the selected destination.

14. A computer system, comprising:
a display;
communication circuitry configured to receive real-time information from a plurality of items;
a user interface configured to receive a command selecting one of the items and one of a plurality of destinations; and
a processor coupled with the display, the communication circuitry, and the user interface, wherein the processor is configured to present a representation of each of the plurality of items and of each of the plurality of destinations on the display, to receive the command from the user interface, and in response to the command, to transmit at least a portion of the real-time information received from the selected item to the selected destination through the communication circuitry.

15. The computer system of claim 14, wherein:
the communication circuitry is configured to receive the command; and
wherein the processor is configured to receive the command from the communication circuitry.

16. The computer system of claim 14, further comprising a contact database coupled with the processor and comprising contact information for each of the plurality of destinations, wherein the processor accesses the contact information for the selected destination to transmit the real-time information received from the selected item.

17. The computer system of claim 16, wherein the contact information comprises at least one of a telephone number, a fax number, and an e-mail address.

18. The computer system of claim 14, wherein:
the user interface is configured to receive a second command selecting a data type; and
the processor is configured to receive the second command from the user interface, and in response to the second command, to transmit the selected data type of the real-time information to the selected destination through the communication circuitry.

19. The computer system of claim 18, wherein:
the user interface is configured to receive a third command selecting a threshold for the selected data type; and
the processor is configured to receive the third command from the user interface, and in response to the third command, to monitor the real-time information received from the selected item through the communication interface to detect when the selected data type surpasses the selected threshold, and to transmit the real-time information received from the selected item to the selected destination through the communication circuitry in response to the selected data type surpassing the selected threshold.

20. The computer system of claim 18, wherein the selected data type comprises data associated with an industrial process.

21. The computer system of claim 20, wherein the selected data type comprises at least one of temperature, pressure, and flow rate.

22. The computer system of claim 14, wherein:
the user interface is configured to receive a second command selecting an update interval; and
the processor is configured to receive the second command from the user interface, and in response to the second command, to transmit the real-time information no more often than the selected update interval.

23. The computer system of claim 14, wherein the selected destination comprises a communication device.

24. The computer system of claim 23, wherein the communication device comprises at least one of a desktop computer, a laptop computer, a personal digital assistant, a landline phone, a cell phone, and a pager.

25. The computer system of claim 14, wherein the selected destination is a user associated with a communication device configured to receive the real-time information received from the selected item.

26. The computer system of claim 14, wherein the selected item comprises a processing unit of an automated process line.

27. The computer system of claim 26, wherein the processing unit comprises at least one of a pump, a valve, a compressor, a condenser, and a container.

* * * * *